United States Patent [19]

Bae

[11] Patent Number: 5,579,118
[45] Date of Patent: Nov. 26, 1996

[54] APPARATUS FOR PROCESSING A STILL SCREEN IN A DIGITAL VIDEO REPRODUCING SYSTEM

[75] Inventor: Moo-Ho Bae, Seoul, Rep. of Korea

[73] Assignee: Daewoo Electronics Co., Ltd., Seoul, Rep. of Korea

[21] Appl. No.: 508,511

[22] Filed: Jul. 28, 1995

[30] Foreign Application Priority Data

Jul. 30, 1994 [KR] Rep. of Korea .................. 94-18852

[51] Int. Cl.$^6$ .............................. H04N 9/79; H04N 9/80
[52] U.S. Cl. .................................. 386/8; 386/12
[58] Field of Search ......................... 358/312, 319, 358/310, 323, 324, 326, 327, 328; H04N 9/79, 9/80

[56] References Cited

U.S. PATENT DOCUMENTS

| | | |
|---|---|---|
| 4,605,951 | 8/1986 | Karibayashi .................. 358/313 |
| 5,218,447 | 6/1993 | Hideo .............................. 358/312 |
| 5,436,729 | 7/1995 | Moro et al. .................... 358/312 |
| 5,497,237 | 3/1996 | Hosokawa et al. .............. 358/312 |

Primary Examiner—Thai Q. Tran
Attorney, Agent, or Firm—Lowe, Price, LeBlanc & Becker

[57] ABSTRACT

An apparatus for processing a still screen in a digital video reproducing system which eliminates a color pattern appearing at a color boundary portion when digital video data is displayed in a still screen mode is disclosed. In the apparatus for processing the still screen in the digital video reproducing system, a horizontal synchronizing signal is delayed or led by one-half period of a chrominance subcarrier at every predetermined scanning field with reference to the chrominance subcarrier, thereby eliminating a jagged pattern at the color boundary portion of the still screen in case of a non-interlaced scanning system. Accordingly, a clear image is provided during the still screen operation while displaying the digital data on a display equipment.

6 Claims, 4 Drawing Sheets

NON-INTERLACED SCANNING SYSTEM

INTERLACED SCANNING SYSTEM

APPARATUS FOR PROCESSING A STILL SCREEN IN A DIGITAL VIDEO REPRODUCING SYSTEM

BACKGROUND OF THE INVENTION

1. Field of the Invention

The present invention relates to an apparatus for processing a still screen in a digital video reproducing system, in which an appearance of a color pattern at a color boundary portion is eliminated when digital video data reproduced by a digital video reproducing system is displayed as a still screen mode.

2. Description of the Prior Art

Currently, a disc type information recording medium is widespread as an audio/video information recording medium on which a large amount of information is recorded. Accordingly, the disc type information recording medium has been developed on which video signals such as graphic picture data, a still picture and fully moving picture information of a movie program are recorded along with related audio signals. As the disc type information recording medium has the merit of being suitable for having a large amount of information recorded thereon, the application field of the disc type information recording medium has gradually tended to expand. A typical disc type information recording medium is a digital video compact disc on which a video signal is recorded by data compressing/restoring processing by means of a method of Moving Picture Experts Group (MPEG). A disc reproducing system for reproducing a video signal read out from a digital video compact disc includes a display equipment such as a color monitor of a television receiver capable of receiving a broadcasting signal as an equipment for outputting the video signal.

When a still screen operation is carried out while the disc reproducing system displays a digital video signal onto a screen of the display equipment thereof, a screen disturbance phenomenon occurs in which a jagged pattern appears at a boundary portion of colors displayed on the screen. The screen disturbance phenomenon is affected by a mutual relation among a chrominance subcarrier, a horizontal synchronizing signal (H.SYNC) and a vertical synchronizing signal (V.SYNC), a method in which luminance/chrominance signal Y/C is separated within the television, and the like, and furthermore relates to a phase of a subcarrier during a horizontal scanning period. The screen disturbance phenomenon of an interlaced scanning system shown in FIG. 1 is distinguished from that of a non-interlaced scanning system shown in FIG. 2. In the interlaced scanning system, the jagged pattern flows at the screen, and an immobile jagged pattern is displayed on the screen in any case of the non-interlaced scanning system. In the interlaced scanning system, as shown in FIG. 1, since the number of scanning lines included in a single field (e.g., an odd field or even field) of a picture displayed on the display equipment is 262.5, a phase of the chrominance subcarrier is inverted at the succeeding field. While closely observing the phase inversion of the chrominance subcarrier and the position of scanning lines, the flowing of the jagged pattern can be recognized.

That is, as is generally known, in case the number of horizontal scanning lines of one field interval is 262 in the non-interlaced scanning system, a period of the chrominance subcarrier included is obtained such that 227.5×262=59605 (cycles). Therefore, the phase of the chrominance subcarrier is not inverted at every field but the same to one another, and the state that the jagged color pattern appears at the color boundary portion in the horizontal direction is caused while displaying the still image on the screen of the display equipment, so that picture quality deteriorates.

For example, U.S. Pat. No. 4,933,748 granted to Shinji Katsuki et al. discloses an apparatus for repeatedly reproducing a single field of a color video signal to convert the single field into interlaced fields of a frame signal capable of being displayed by a standard monitor television receiver, in order to solve a phenomenon that the color at the upper portion of a displayed picture is disturbed when a frame signal having the discontinuous phase of its chrominance subcarrier is supplied to the color monitor television receiver.

FIG. 3 is a block diagram for showing an apparatus for processing a repeatedly reproduced single field of a color video signal, described in the above-mentioned U.S. Patent. As shown in FIG. 3, the apparatus for processing the color video signal includes a recording disc 31 having a color video signal of one field recorded in a circular track on disc 31. Such a color video signal of one field is repeatedly reproduced from disc 31 by means of a reproducing head 32 and supplied to a separate circuit 34 from reproducing head 32 through a playback amplifier 33. In separate circuit 34, a luminance signal Y and color or chrominance signal C are separated from the reproduced signal. The separated luminance signal Y is supplied to an FM-demodulator 35 and the resulting modulated luminance signal is supplied to a mixing circuit 36.

The separated chrominance signal C is supplied from separating circuit 34 to an FM-demodulator 37 and the resulting demodulated chrominance signal is fed to a chroma processing circuit 38 in which two color difference signals R-Y and B-Y recorded in a line-sequential manner are made to exit substantially simultaneously. The resulting processed color difference signals R-Y and B-Y are supplied to quadrature two-phase modulators 39a and 39b, respectively. The outputs of modulators 39a and 39b are supplied to mixing circuit 36, and an output of mixing circuit 36 is supplied directly to a contact a of a switching circuit 42 and through a delay circuit 43 to a contact b of switching circuit 42 which further has its movable contact c connected to an output terminal 45.

The chrominance subcarrier signal from an oscillator 40 is supplied both to a 90 degree phase-shifter 41 and to a 180 degree phase-shifter 47. Further, a switching circuit 48 is provided with a switch 48A having fixed contacts a and b connected to the output of oscillator 40 and the output of 90 degree phase-shifter 41, while a movable contact c of switch 48A is connected to quadrature two-phase modulator 39a. A second switch 48B of switching circuit 48 has fixed contacts a and b connected to the output of 90 degree phase-shifter 41 and the output of 180 degree phase-shifter 47, respectively, while a movable contact c of switch 48B is connected to quadrature two-phase modulator 39b. Switches 48A and 48B of switching circuit 48 are operated by a switching signal FS applied to a terminal 44 so that ganged movable contacts c of switches 48A and 48B are changed-over alternately between first and second states or conditions shown in full lines and in broken lines, respectively, at each of the field periods of the color video signal. The chrominance subcarrier produced by oscillator 40 has its phase inverted at every horizontal scanning period in accordance with the NTSC standard.

According to the apparatus for processing the color video signal, even though the chrominance subcarrier provided by oscillator 40 has its phase inverted at every horizontal scanning period in accordance with the NTSC standard, the further shifting of the phase of the chrominance subcarrier by 90 degrees at every field ensures that the phase of the chrominance subcarrier of the frame signal is continuous at the time of the change-over of switching circuit 42 when the field signal issuing from mixing circuit 36 is selectively delayed during alternating fields period for a delay time equal to one-half of horizontal scanning period, as by delay circuit 43 and switching circuit 42, for forming interlaced fields of a frame. Thus, it is possible to obtain a reproduced picture of excellent quality without any disturbance of the color, particularly at the upper portion of the picture.

The apparatus for repeatedly reproducing the single field, however, is applicable only when the single field of the color video signal provided by an electronic still camera scans the color monitor television receiver in the interlaced scanning system in order to be displayed as a still image, thereby being limited in its application.

Consequently, a screen processing apparatus capable of obtaining a still image of excellent picture quality during the still screen operation is required while the picture image is displayed on a display equipment by the non-interlaced scanning system in a video reproducing system such as a digital video reproducing system.

SUMMARY OF THE INVENTION

It is an object of the present invention to provide an apparatus for processing a still screen in a digital video reproducing system for reproducing a digital video signal from a digital video information recording medium having digital video data recorded thereon, in which a horizontal synchronizing signal is delayed or led by one-half period of a chrominance subcarrier at every predetermined scanning field with reference to the chrominance subcarrier while a picture image of digital video data displayed on a screen of a display equipment is stationary, so that a screen disturbance phenomenon appearing on a still screen in case of a non-interlaced scanning system is eliminated.

In order to achieve the above object, the present invention provides an apparatus for processing a still screen in a digital video reproducing system, which comprises:

a first frequency demultiplying section for demultiplying a chrominance subcarrier reproduced from a video information recording medium and outputting a first frequency demultiplying section signal being a horizontal synchronizing signal;

a second frequency demultiplying section for demultiplying the first frequency demultiplying section signal provided by the first frequency demultiplying section in a predetermined frequency demultiplying ratio and outputting a second frequency demultiplying section signal being a vertical synchronizing signal;

an inverting section for inverting the chrominance subcarrier and outputting an inverting section signal;

a first delaying section for delaying the horizontal synchronizing signal provided by the first frequency demultiplying section in response to the inverting section signal which the inverting section applies to a first delaying section clock input thereof, and outputting a first delaying section signal;

a second delaying section for delaying the first frequency demultiplying section signal provided by the first frequency demultiplying section in response to the chrominance subcarrier applied to a second delaying section clock input thereof, and outputting a second delaying section signal;

a third frequency demultiplying section for outputting a third frequency demultiplying section signal corresponding to a signal obtained by frequency-demultiplying the vertical synchronizing signal by two from a third frequency demultiplying section inverting output thereof connected to a third frequency demultiplying section data input thereof in response to the vertical synchronizing signal which the second frequency demultiplying section applies to a third frequency demultiplying section clock input thereof; and a switching section for switching the first delaying section signal and the second delaying section signal respectively provided by the first delaying section and the second delaying section in response to the third frequency demultiplying section signal which the third frequency demultiplying section applies to a third switching section input thereof as a switching control signal.

In the apparatus for processing the still screen in the digital video reproducing system according to the present invention, the horizontal synchronizing signal that delays or precedes the vertical synchronizing signal to have a phase difference by one-half period of a chrominance subcarrier at every predetermined scanning field with respect to the chrominance subcarrier is selected to invert the phase of the chrominance subcarrier at every scanning field. Therefore, the screen disturbance phenomenon occurring at a color boundary portion of a video screen can be solved.

BRIEF DESCRIPTION OF THE DRAWINGS

The above object and other advantages of the present invention will become more apparent by describing in detail the preferred embodiment of the present invention with reference to the attached drawings, in which.

DESCRIPTION OF THE PREFERRED EMBODIMENT

A description will be given below in detail to the configuration and operation of an apparatus for processing a still screen in a digital video reproducing system according to an embodiment of the present invention with reference to the accompanying drawings.

Figure 2:
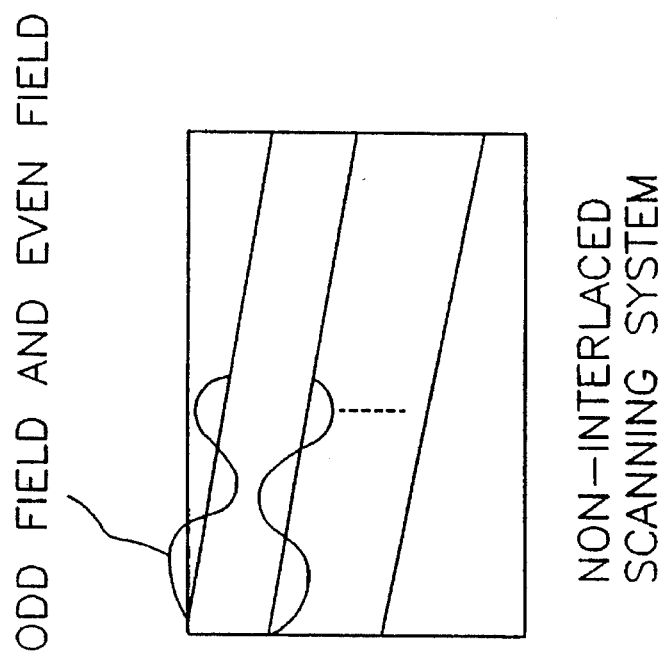
FIG. 2 is a view for showing a phase relation between a horizontal synchronizing signal and a chrominance subcarrier when digital video data reproduced from a conventional digital video information recording medium such as a digital video compact disc is displayed on a display equipment in a non-interlaced scanning system.
Figure 1:
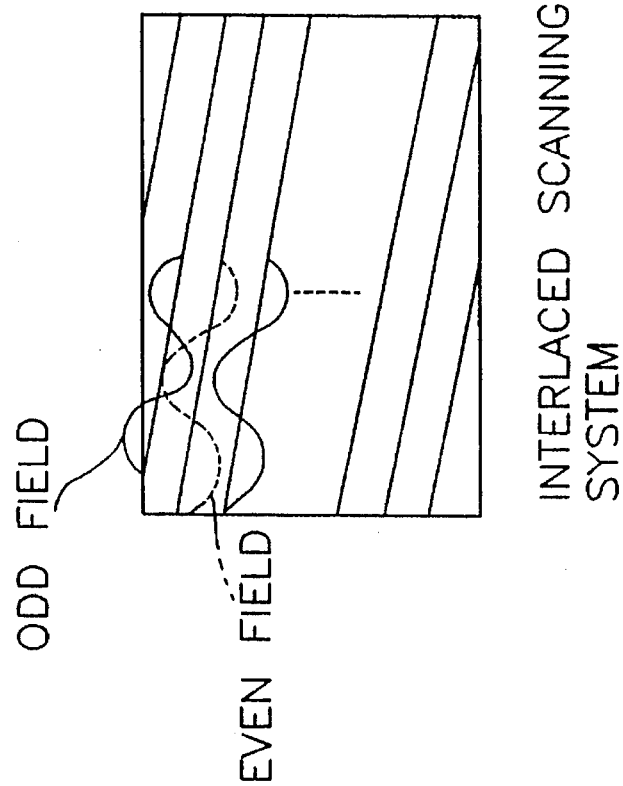
FIG. 1 is a view for showing a phase relation between a horizontal synchronizing signal and a chrominance subcarrier when digital video data reproduced from a conventional digital video information recording medium such as a digital video compact disc is displayed on a display equipment in an interlaced scanning system.
Figure 3:
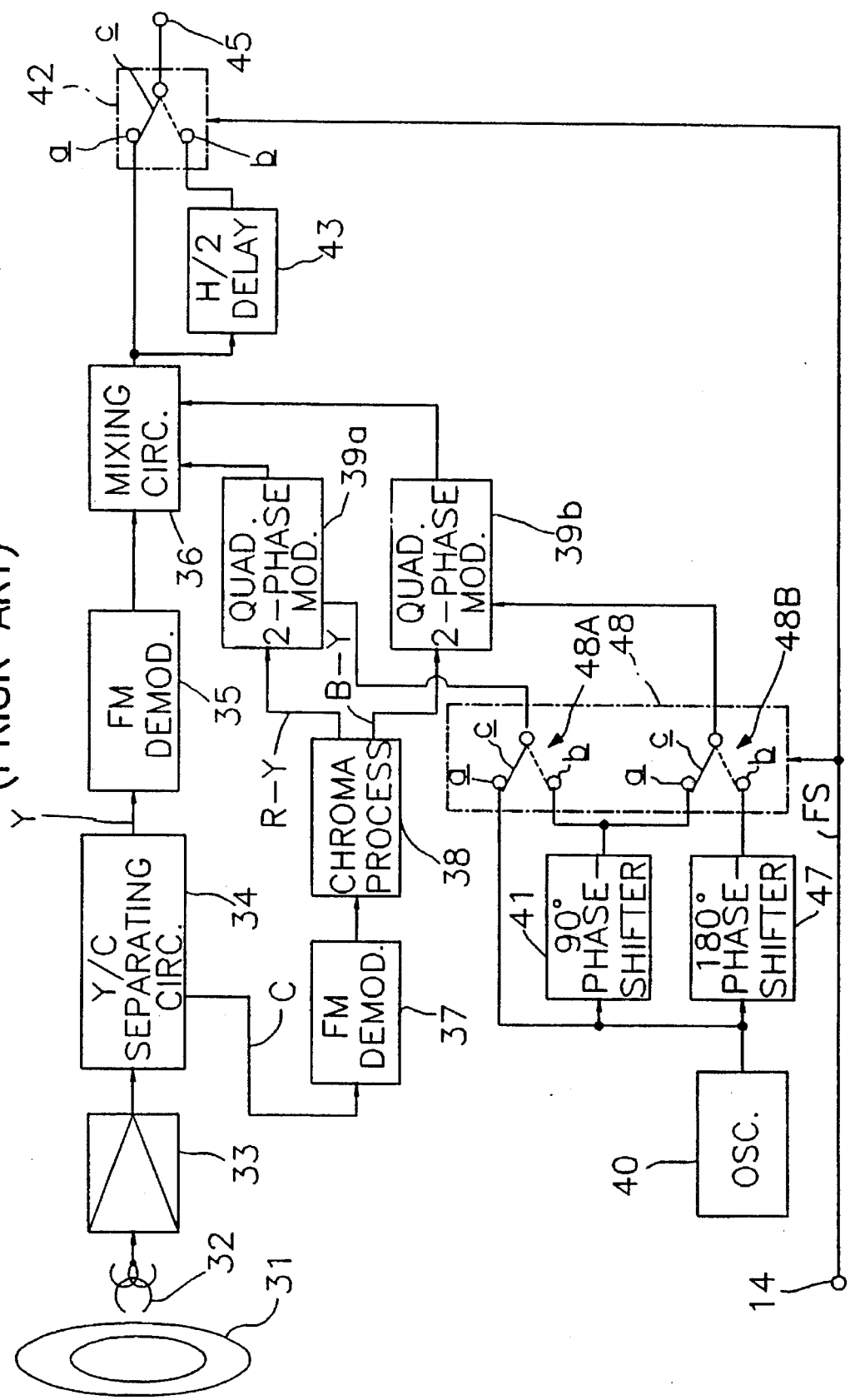
FIG. 3 is a block diagram for showing an apparatus for processing a repeatedly reproduced single field of a color video signal disclosed in U.S. Pat. No. 4,933,748.
Figure 4:
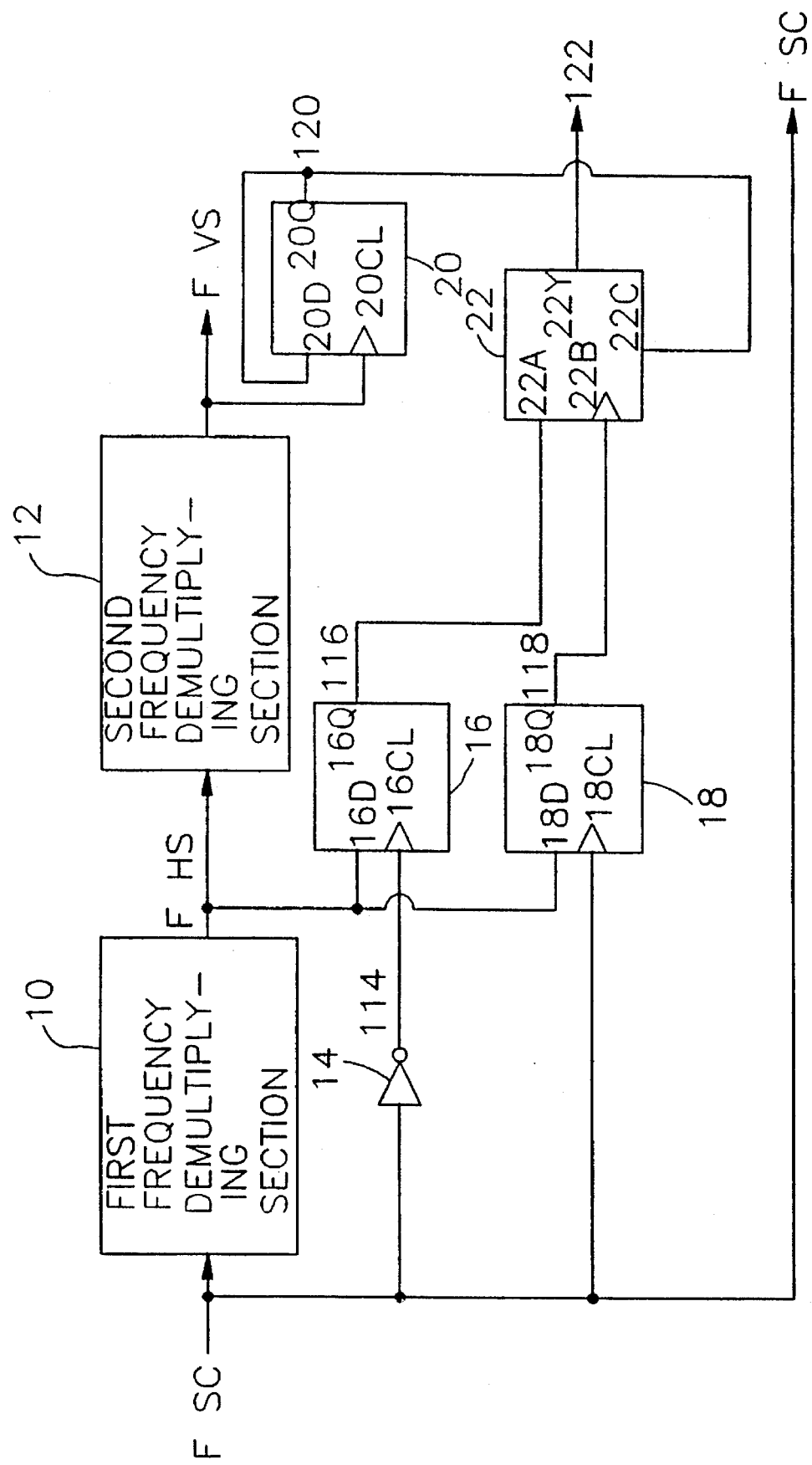
FIG. 4 is a block diagram for showing a configuration of an apparatus for processing a still screen in a digital video reproducing system according to one embodiment of the present invention.

FIG. 4 is a block diagram for showing a configuration of an apparatus for processing a still screen in a digital video reproducing system according to one embodiment of the present invention. FIGS. 5A to 5D are timing diagrams for showing operations of the principal parts of the apparatus for processing the still screen shown in FIG. 4.

A first frequency demultiplying section 10 frequency-demultiplies a chrominance subcarrier F.SC reproduced from a video information recording medium in order to output a first frequency demultiplying section signal F.HS which is a horizontal synchronizing signal. A frequency-demultiplying ratio in first frequency demultiplying section 10 is set to frequency-demultiply chrominance subcarrier F.SC by 455/2. A second frequency demultiplying section 12 frequency-demultiplies first frequency demultiplying section signal F.HS provided by first frequency demultiplying section 10 in a predetermined frequency-multiplying ratio in order to output a second frequency demultiplying section signal F.VS which is a vertical synchronizing signal. The frequency-demultiplying ratio of second frequency demultiplying section 12 is set to frequency-demultiply first frequency demultiplying section signal F.HS by 262.

An inverting section 14 is embodied with an inverter for inverting chrominance subcarrier F.SC and outputs an inverting section signal 114 which is obtained by inverting chrominance subcarrier F.SC. A first delaying section 16 delays horizontal synchronizing signal F.HS provided by first frequency demultiplying section 10 in response to inverting section signal 114 which inverting section 14 applies to a first delaying section clock input 16CL thereof, and outputs a first delaying section signal 116. A second delaying section 18 delays first frequency demultiplying section signal F.HS provided by first frequency demultiplying section 10 in response to chrominance subcarrier F.SC applied to a second delaying section clock input 18CL thereof, and outputs a second delaying section signal 118.

At this time, first delaying section 16 outputs first delaying section signal 116 (refer to FIG. 5C) which is a delay section signal of first frequency demultiplying section signal F.HS (refer to FIG. 5B) at the rising edge of inverting section signal 114. Meantime, second delaying section 18 outputs second delaying section signal 118 (refer to FIG. 5D) which is a delay signal of first frequency demultiplying section signal F.HS (refer to FIG. 5B) at the rising edge of chrominance subcarrier F.SC (refer to FIG. 5A). Accordingly, first delaying section signal 116 and second delaying section signal 118 respectively outputted from first delaying section 16 and second delaying section 18 have a phase difference of one-half period (i.e., 180°) with respect to chrominance subcarrier F.SC. In FIGS. 5A to 5D, fc denotes the period of chrominance subcarrier F.SC.

A third frequency demultiplying section 20 outputs a third frequency demultiplying section signal 120 which is obtained by frequency-demultiplying vertical synchronizing signal F.VS by two through a third frequency demultiplying section inverting output 20Q' connected to a third frequency demultiplying section data input 20D thereof in response to vertical synchronizing signal F.VS which second frequency demultiplying section 12 applies to third frequency demultiplying section clock input 20CL thereof. A switching section 22 inputs third frequency demultiplying section signal 120 which third frequency demultiplying section 20 applies to a third switching section input 22C thereof as a switching control signal, and switches first delaying section signal 116 and second delaying section signal 118 respectively provided by first delaying section 16 and second delaying section 18. Switching section 22 is embodied with a device such as a multiplexer.

Hereinafter, an operation of the apparatus for processing the still screen in the digital video reproducing system according to the present invention having the configuration as above will be described.

Figures 5A, 5B, 5C, 5D:
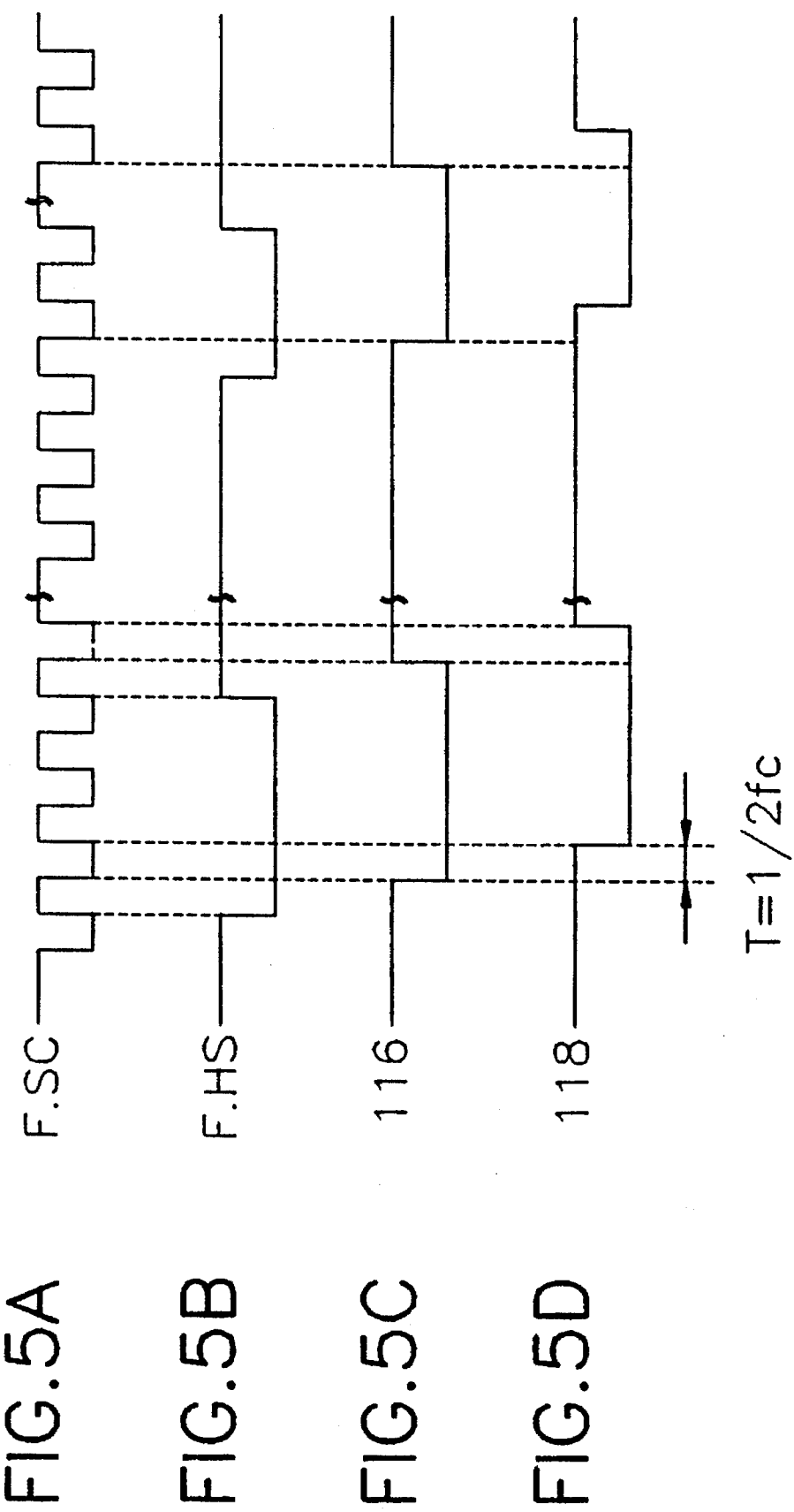
FIGS. 5A to 5D are timing diagrams for showing operations of the principal parts of the apparatus for processing the still screen shown in FIG. 4.

First frequency demultiplying section signal F.HS which is the horizontal synchronizing signal shown in FIG. 5B is generated while chrominance subcarrier F.SC of image information shown in FIG. 5A is inputted to first frequency demultiplying section 10 in order to be frequency-demultiplied by the frequency-demultiplying ratio of 455/2. Second frequency demultiplying section signal F.VS (not shown) which is the vertical synchronizing signal is generated while first frequency demultiplying section signal F.HS is applied to second frequency demultiplying section 12 having the frequency-demultiplying ratio of 262 in order to be frequency-demultiplied by the frequency-demultiplying ratio of 262.

On the other hand, chrominance subcarrier F.SC is inverted by inverting section 14, and inverting section signal 114 which is the inverted chrominance subcarrier is applied to first delaying section clock input 16CL of first delaying section 16. Chrominance subcarrier F.SC is applied to second delaying section clock input 18CL of second delaying section 18. Also, while first frequency demultiplying section signal F.HS (shown in FIG. 5B) is inputted to both a first delaying section data input 16D of first delaying section 16 and a second delaying section data input 18D of second delaying section 18, first delaying section signal 116 and second delaying section signal 118 which have a phase difference corresponding to one-half period of chrominance subcarrier F.SC to each other as shown in FIGS. 5C and 5D are generated.

Since third frequency demultiplying section inverting output 20Q' and third frequency demultiplying section data input 20D of third frequency demultiplying section 20 are commonly connected with each other, third frequency demultiplying section signal 120 corresponding to the signal obtained by frequency-demultiplying vertical synchronizing signal F.VS by two and outputted from third frequency demultiplying section inverting output 20Q' is applied to third switching section input 22C of switching section 22 as a switching signal while second frequency demultiplying section signal F.VS corresponding to the vertical synchronizing signal is applied to third frequency demultiplying section clock input 20CL. At this time, switching section 22 outputs a switching section signal 122 which is the horizontal synchronizing signal delayed by maintaining the phase difference by one-half period of chrominance subcarrier F.SC at every even or odd field, while first delaying section signal 116 and second delaying section signal 118 are respectively applied to a first switching section input 22A and a second switching section input 22B of switching section 22. Thus, the phase of chrominance subcarrier F.SC is inverted at every field in order to eliminate the screen disturbance phenomenon in which a color pattern appears at the color boundary portion of an image in case video data are displayed on a still screen of a display equipment.

In an apparatus for processing a still screen in a digital video reproducing system according to the present invention, a phase of a horizontal synchronizing signal is delayed or led by one-half period of a chrominance subcarrier with respect to the chrominance subcarrier, and the delayed or led horizontal synchronizing signal is selectively outputted at every scanning field. As a result, the phase of the chrominance subcarrier is inverted at every scanning field in order to eliminate the afore-mentioned screen disturbance phenomenon. Accordingly, a clear still image can be provided during the still screen operation while displaying the digital video data on a display equipment.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for processing a still screen in a digital video reproducing system, said apparatus comprising:

a first frequency demultiplying section for demultiplying a chrominance subcarrier reproduced from a video information recording medium and outputting a first frequency demultiplying section signal being a horizontal synchronizing signal;

a second frequency demultiplying section for demultiplying the first frequency demultiplying section signal provided by the first frequency demultiplying section in a predetermined frequency demultiplying ratio and outputting a second frequency demultiplying section signal being a vertical synchronizing signal;

an inverting section for inverting the chrominance subcarrier and outputting an inverting section signal;

a first delaying section for delaying the horizontal synchronizing signal provided by the first frequency demultiplying section in response to the inverting section signal which the inverting section applies to a first delaying section clock input thereof, and outputting a first delaying section signal;

a second delaying section for delaying the first frequency demultiplying section signal provided by the first frequency demultiplying section in response to the chrominance subcarrier applied to a second delaying section clock input thereof, and outputting a second delaying section signal;

a third frequency demultiplying section for outputting a third frequency demultiplying section signal corresponding to a signal obtained by frequency-demultiplying the vertical synchronizing signal by two from a third frequency demultiplying section inverting output thereof connected to a third frequency demultiplying section data input thereof in response to the vertical synchronizing signal which the second frequency demultiplying section applies to a third frequency demultiplying section clock input thereof; and a switching section for switching the first delaying section signal and the second delaying section signal respectively provided by the first delaying section and the second delaying section in response to the third frequency demultiplying section signal which the third frequency demultiplying section applies to a third switching section input thereof as a switching control signal.

2. An apparatus for processing a still screen in a digital video reproducing system as claimed in claim 1, wherein the frequency-demultiplying ratio of the first frequency demultiplying section is set to frequency-demultiply the chrominance subcarrier by 455/2.

3. An apparatus for processing a still screen in a digital video reproducing system as claimed in claim 1, wherein the frequency-demultiplying ratio of the second frequency demultiplying section is set to frequency-demultiply the first demultiplying section signal by 262.

4. An apparatus for processing a still screen in a digital video reproducing system as claimed in claim 1, wherein the inverting section includes an inverter for inverting the chrominance subcarrier.

5. An apparatus for processing a still screen in a digital video reproducing system as claimed in claim 1, wherein the switching section includes a multiplexer for multiplexing the first delaying section signal and the second delaying signal.

6. An apparatus for processing a still screen in a digital video reproducing system, said apparatus comprising:

a first frequency demultiplying section for demultiplying a chrominance subcarrier reproduced from a video information recording medium in the frequency-demultiplying ratio of 455/2, and outputting a first frequency demultiplying section signal being a horizontal synchronizing signal;

a second frequency demultiplying section for demultiplying the first frequency demultiplying section signal provided by the first frequency demultiplying section in the frequency-demultiplying ratio of 262, and outputting a second frequency demultiplying section signal being a vertical synchronizing signal;

an inverter for inverting the chrominance subcarrier and outputting an inverting section signal;

a first delaying section for delaying the horizontal synchronizing signal provided by the first frequency demultiplying section in response to the inverting section signal which the inverting section applies to a first delaying section clock input thereof, and outputting a first delaying section signal;

a second delaying section for delaying the first frequency demultiplying section signal provided by the first frequency demultiplying section in response to the chrominance subcarrier applied to a second delaying section clock input thereof, and outputting a second delaying section signal;

a third frequency demultiplying section for outputting a third frequency demultiplying section signal corresponding to a signal obtained by frequency-demultiplying the vertical synchronizing signal by two from a third frequency demultiplying section inverting output thereof connected to a third frequency demultiplying section data input thereof in response to the vertical synchronizing signal which the second frequency demultiplying section applies to a third frequency demultiplying section clock input thereof; and a multiplexer for multiplexing the first delaying section signal and the second delaying section signal respectively provided by the first delaying section and the second delaying section in response to the third frequency demultiplying section signal which the third frequency demultiplying section applies to a third switching section input thereof as a switching control signal.

* * * * *